Sept. 15, 1970　　C. F. SONNENBERG ET AL　　3,529,072
HIGH-MECHANICAL-STRENGTH TERMINAL BUSHING HAVING BUSHING BODY
PORTION FIXEDLY SUPPORTED BY FLANGE-TUBE ASSEMBLY AND
FLEXIBLE CASING SUPPORT
Filed March 25, 1968
4 Sheets-Sheet 1
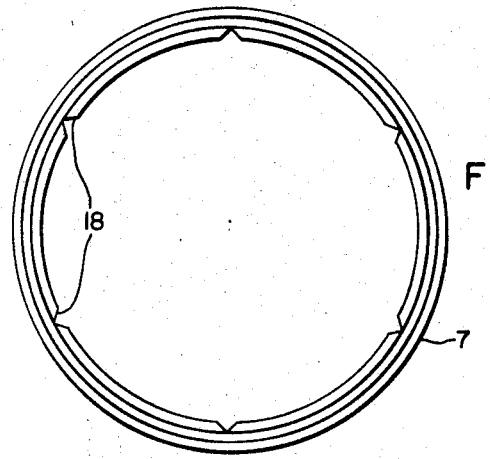
FIG.6.
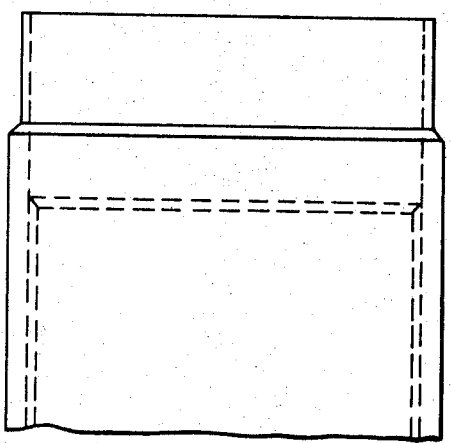
FIG.5.
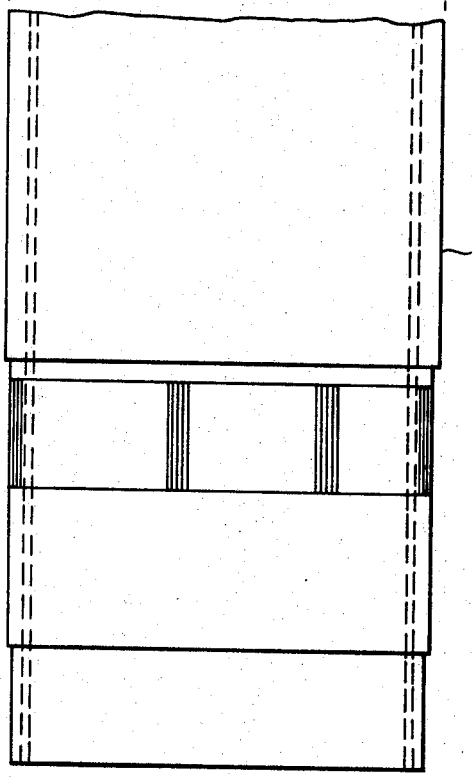
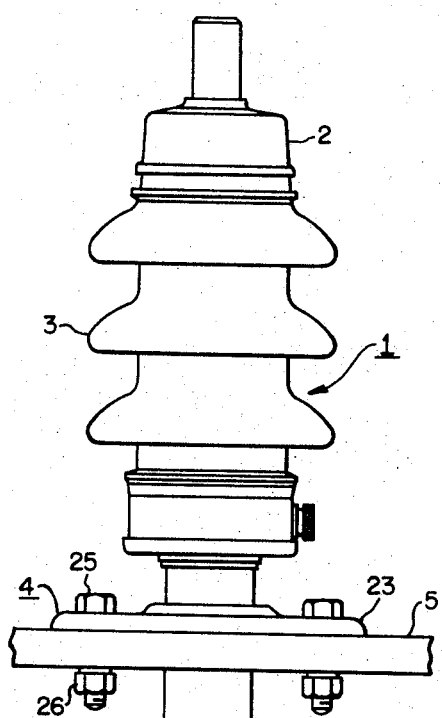
FIG.1.
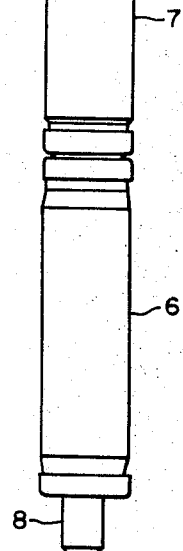

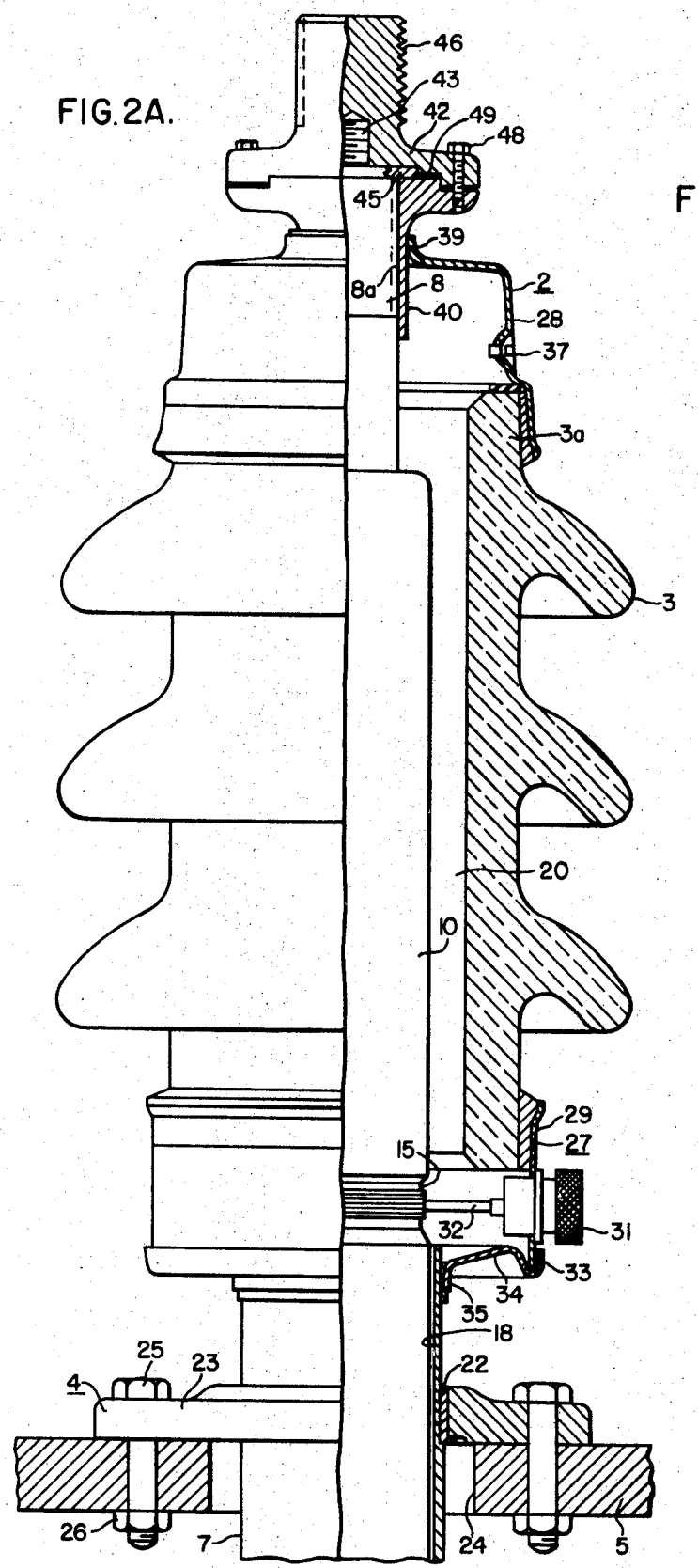

SF$_6$ GAS UNDER PRESSURE

United States Patent Office 3,529,072
Patented Sept. 15, 1970

3,529,072
HIGH-MECHANICAL-STRENGTH TERMINAL BUSHING HAVING BUSHING BODY PORTION FIXEDLY SUPPORTED BY FLANGE-TUBE ASSEMBLY AND FLEXIBLE CASING SUPPORT
Charles F. Sonnenberg, Monroeville, and James H. Frakes, Penn Hills, Pittsburgh, Pa., assignors to Westinghouse Electric Corporation, Pittsburgh, Pa., a corporation of Pennsylvania
Filed Mar. 25, 1968, Ser. No. 715,848
Int. Cl. H01b 17/26
U.S. Cl. 174—31  10 Claims

ABSTRACT OF THE DISCLOSURE

An insulating body for a terminal bushing is firmly secured, or fastened to the flange sleeve of the flange-mounting structure; and the upper and lower insulating casings are flexibly secured to the mounting flange assembly, so that no stresses are imposed upon the upper and lower insulating casing structures. The insulating medium between the inner walls of the upper and lower insulating casings and the condenser body may be a suitable dielectric liquid, such as oil, or the intervening space may be filled with a high-dielectric-strength gaseous medium, such as sulfur hexafluoride ($SF_6$) gas, preferably under pressure, such as 45 p.s.i. The insulating casings may be of porcelain, butyl rubber, an elastomeric material, or a resinous material, such as an epoxy resin or a polyester resin. The condenser body may be of kraft-paper windings with metallic foil inserted into the paper during the winding operation, or the insulating body of the terminal bushing may be a thermosetting resin, such as a suitable polyester resin or an epoxy resin. Ducts or passages are provided along the mounting-flange assembly so that there exists communication between the upper and lower chambers, so that oil or gaseous fluids may freely communicate between the upper and lower chambers through the intervening passages provided by the mounting-flange construction.

CROSS-REFERENCES TO RELATED APPLICATIONS

Applicants are not aware of any related applications pertinent to the present invention.

BACKGROUND OF THE INVENTION

It has been customary heretofore in the construction of high-voltage bushings to employ upper and lower porcelain casings under heavy compressive stress by utilizing a plurality of heavy compression springs within the cap structure of the high-voltage terminal bushing. The compressive force, exerted by the aforesaid springs within the cap structure, maintains the porcelain casings under heavy compression against the mounting-flange assembly, preferably gaskets being supplied therebetween. However, the insulating body surrounding the central conducting stud, which may be either a wholly insulating body, or an insulating body having intervening metallic condenser sections embedded therein, has been maintained in a relatively "floating" condition relative to the outer porcelain casings. The aforesaid construction has necessitated heavy cap spring pressures and large physical size of the upper and lower porcelain casings, so as to have sufficient mechanical strength and gasket-surface area.

SUMMARY OF THE INVENTION

It is a distinct purpose of the present invention to provide an improved high-voltage terminal bushing having reduced dimensions, and providing a novel construction such that the insulating upper and lower casing structures are not imposed with axial or cantilever forces; and according to the present invention, these objects are accomplished by securely, or fixedly attaching the flange sleeve to the mid-portion of the insulating or condenser body surrounding the axially-extending conductor stud, or terminal lead. Following this secure attachment of the condenser body to the flange tube, preferably the upper and lower casing structures are flexibly secured to the upper end of the terminal lead, to the upper portion of the mounting-flange structure; and the lower casing structure is flexibly secured to the lower end of the terminal lead and to the lower end of the mounting-flange structure, preferably by flexibe diaphragm structures of spun or formed material, such as thin copper sheeting.

The insulating body, or the condenser body may be formed by wrappings of kraft paper, with metallic foil inserted at intervals to provide the condenser sections, as well known in the art, or the insulating body may be formed of a suitable thermosetting resin, such as an epoxy resin or a polyester resin. If desired, metallic foil, or condenser sections may be embedded within the thermosetting resin during the molding and curing operations.

Accordingly, it is a general object of the present invention to provide an improved high-mechanical-strength terminal bushing in which the upper and lower insulating casing structures are relieved from the customary stress imposed thereon by providing a secure attachment of the condenser body itself to the conducting mounting-flange tube, and securing the casings to the central mounting flange and conducting tube parts by flexible connections.

Still a further object of the present invention is to provide an improved high-strength terminal bushing of reduced dimensions.

Still a further object of the present invention is to provide an improved high-strength terminal bushing in which the flange tube may constitute part of the molding structure for casting the insulating body of the terminal bushing.

Still a further object of the present invention is the provision of the high-mechanical-strength terminal bushing having the casing structures free from stress conditions, and affording communication between the upper and lower dielectric chambers of the terminal bushing, so that oil communication, or gas communication may take place through such passages.

Such passages may assume either the form of axially-extending grooves on the inner surface of the flange tube, or in another construction, may actually constitute axially-extending ducts, or bores within the body portion of the flange tube.

Another object of the present invention is to provide an improved high-mechanical-strength terminal bushing which is completely hermetically sealed, and is constructed such as not to impose any stresses upon the upper and lower insulating casing structures of the terminal bsuhing.

Further objects and advantages will readily become apparent upon reading the following specification, taken in conjunction with the drawings.

BRIEF DESCRIPTION OF THE DRAWINGS

FIG. 1 is a side elevational view of a terminal bushing incorporating the principles of the present invention;

FIGS. 2A and 2B collectively illustrate a quarter sectional view through the improved terminal bushing of FIG. 1;

FIGS. 3A and 3B collectively illustrate the internally-disposed condenser body of the terminal bushings of FIGS. 1 and 2;

FIGS. 5 and 6 illustrate, respectively, the flange sleeve and the top plan view thereof, illustrating the axially-extending communicating grooves;

DESCRIPTION OF THE PREFERRED EMBODIMENTS

Figure 2B:
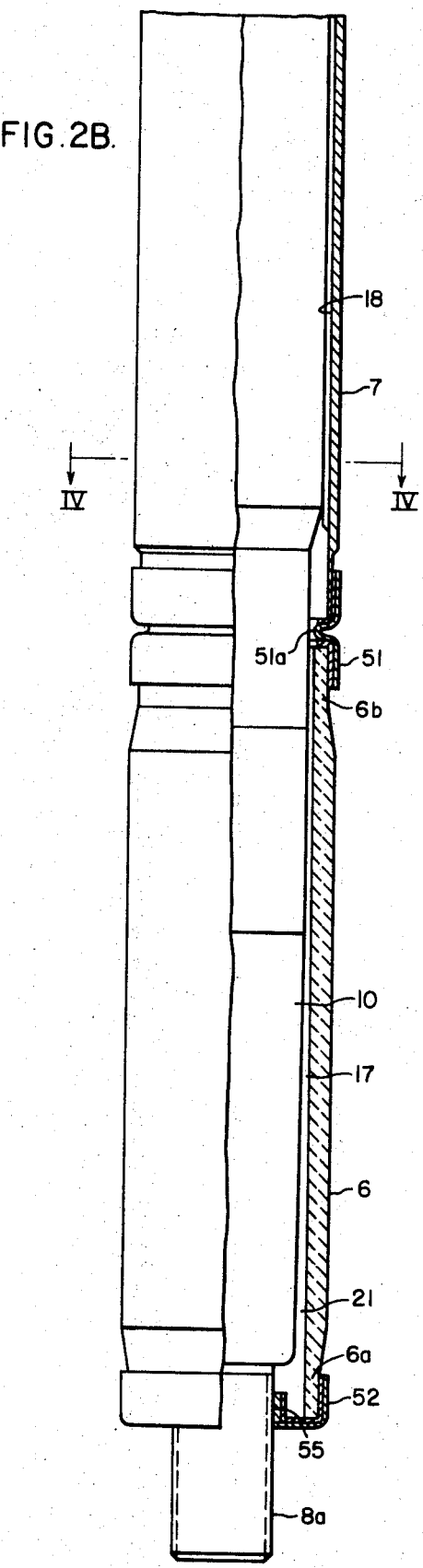
Figure 3B:
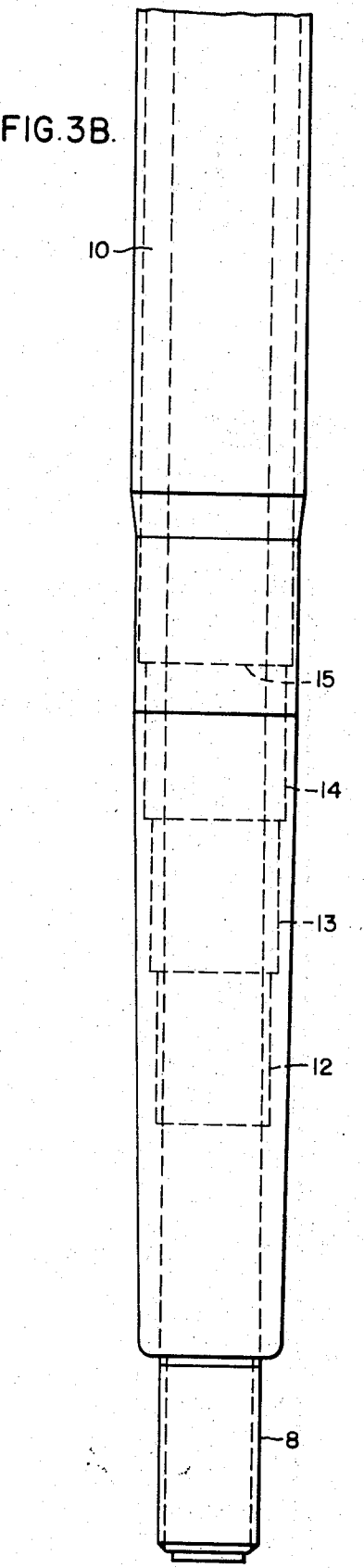
Figure 4:
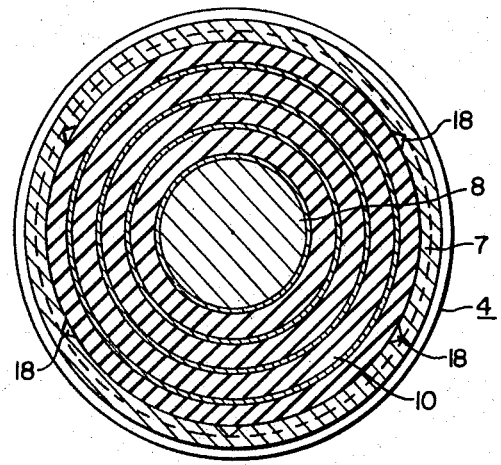
FIG. 4 is a sectional view taken substantially along the line IV—IV of FIG. 2B.

As well known by those skilled in the art, terminal-bushing structures are utilized in many applications, such as in circuit-breaker tanks supporting the arc-interrupting units therein; or the terminal-bushing structure may be utilized in connection with transformer applications, in which a suitable lead is "fished" through the conducting tube of the terminal bushing, and secured at the upper end thereof. Also, as well known by those skilled in the art, the function of terminal bushings is to provide the entrance of the high-voltage conductor through the tank structure of the associated equipment, and since the high voltage may be of the order of 230 kv., or higher, generally, means are provided to reduce the axial and radial voltage gradients through the insulating body surrounding the conductor lead, and assuming the form of a plurality of condenser sections to grade the voltage radially and longitudinally through the insulating body portion of the condenser section. To provide weathed-proof protection from the elements, it is customary to provide a weather-proof insulating casing, assuming the form of a porcelain casing, a butyl rubber casing, or an elastomeric casing; and in the space between the inner wall of the aforesaid weather-proof casing structure and the outer surface of the condenser body, it has been customary to provide a dielectric medium, such as oil, to additionally assist in providing a high-dielectric strength between the grounded mounting-flange structure and the interiorly-extending high-voltage terminal lead.

Heretofore, in the provision of high-voltage terminal bushings, it has been customary to utilize heavy upper and lower porcelain casings, having a large gasket-surface area against the intervening grounded mounting-flange structure, so that the axial and cantilever forces are imposed upon the porcelain upper and lower casing structures through the gasketed joints, and the condenser body itself has been "floating" relative to the imposition of any stress conditions. As a result, in the latter-mentioned type of prior-art terminal bushing, the paper wrappings of the condenser body have not been bonded together, and have been loosely wound thereby affording a maximum of impregnation of the oil into the paper body structure of the condenser body.

As mentioned herein before, it is a distinct purpose of the present invention to provide an improved high-mechanical-strength terminal bushing, adaptable for a wide variety of voltage ranges, say from 23 kv. to 69 kv., for example, in which the stresses heretofore imposed upon the upper and lower casing structures are eliminated by the secure attachment, or fixedly-mounting relation between the condenser body and the surrounding mounting-flange structure. In other words, it is a distinct feature of the present invention to firmly press the condenser body within the flange tube of the mounting-flange structure, so as to afford a secure attachment therebetween. With this arrangement, the upper and lower porcelain, or insulating casing structures may be flexibly secured into position, and will have no stress conditions imposed thereon.

FIG. 1 generally illustrates a side elevational view of a high-voltage terminal bushing incorporating the principles of the present invention. As shown, it will be noted that, generally, the terminal-bushing structure 1 includes an upper cap structure 2, an upper weather-proof porcelain casing 3, an intervening grounded mounting-flange structure 4, adaptable for securement to the wall 5 of an associated tank structure, and a lower casing structure 6, assuming the form of a lower insulating casing flexibly secured to the lower end of the flange tube 7 and also to a lower end of the terminal lead, or conductor 8 extending axially through the terminal bushing 1.

FIGS. 2A and 2B collectively illustrate a quarter-sectional view taken through the terminal bushing 1 of FIG. 1. It will be observed that there is provided the longitudinally, or axially-extending conducting tube 8, which is at high voltage in the normal operation of the device. Surrounding the longitudinally-extending conductor tube 8 is an insulating body 10, in some instances, assuming the form of a condenser body, which may be fabricated by winding insulating kraft paper having shellac on one side thereof, to bond or make the paper secure and give greater mechanical strength. The paper impregnates easily with oil. The shellac on one side of the kraft paper, or other paper, causes the layers of paper to secure, or adhere together. Periodically, metallic foil layers 12–15, in the form of layers of electrolytic copper foil, shellac coated on both sides, are wound on, and this results in an equal-capacity condenser combination. The condenser construction is desirable, electrically, in that it permits scientific control of the voltage gradient through the condenser body 10, both radially and longitudinally, Under operating conditions, the voltage gradient radially through the insulation; longitudinally, over the surface of the condenser body 10—is practically uniform. It is below the voltage, which will produce breakdown of the paper, or of the air. The aforesaid condenser body 10 is heated to effect a curing operation, and is vacuum-impregnated with oil 17. The condenser body 10 is then forced, with a press fit, through the flange sleeve 7, more clearly shown in FIGS. 5 and 6 of the drawings.

With particular attention being directed to FIGS. 5 and 6 of the drawings, it will be noted that there is provided on the inner wall of the flange tube 7 a plurality of circumferentially-spaced communicating grooves 18, which afford communication between the oil region 20 above the mounting-flange structure 4 and the oil region, or cavity 21 in the lower portion of the terminal bushing 1. The press fit between the condenser body 10 and the flange tube 7 affords a secure attachment therebetween, so that any stresses which are imposed upon the conductor lead 8, either axially or as cantilever stresses, are, in turn, imposed upon the flange tube 7, and consequently upon the mounting-flange assembly 4, more clearly illustrated in FIG. 2A of the drawings.

With reference to FIG. 2A, it will be observed that the flange tube 7 is, in turn, forced into a metallic ring 22, and through the mounting-flange plate 23, which is secured adjacent the opening 24 of the wall 5 of the related tank structure by a plurality of mounting bolts 25 and nuts 26. As a result, the mounting flange 4 is secured in place, and any stresses exerted upon the conductor stud 8 are directly imposed upon the mounting-flange structure 4 and hence to the tank wall 5.

It is a distinct purpose of the present invention to avoid imposing stresses upon the upper and lower insulating casing sections 3, 6. As illustrated in FIGS. 2A and 2B, the upper porcelain casing 3 is flexibly secured to the upper end of the flange tube 7 by a sealing arrangement 27 having flexibility; and the upper end 3a of the porcelain casing 3 is likewise flexibly secured to the upper end of the tubular conductor lead 8. The solder-sealed methods are set forth in U.S. Pat. 1,852,093 issued Apr. 5, 1932, to Lloyd Smede and Errol B. Shand, and assigned to the assignee of the instant application. Additionally, the solder-sealing methods set forth in Barrow Pat. 1,872,557, issued Aug 16, 1932 may be utilized. Generally, as well known by those skilled in the art, the fired and glazed porcelain casing 3 is used and has a gold and platinum, collodial form in varnish, painted on the ends of the porcelain weather casing 3. The painted porcelain casings 3 are then fired in electric furnaces at closely-controlled temperatures. The metallic compound becomes a high-luster, permanent integral part of the glaze on the porcelain casing 3. These metal bands are then tinned, preparatory to the subsequent soldering operations. A spun, or drawn copper ring or cap 28 is soldered to the upper end 3a of the porcelain 3, and a spun cooper ring 29 is soldered to the lower end, all as set forth in the aforesaid patents.

It will be observed that a power-factor cap assembly 31 is provided through the side wall of the lower soldered ring 29, with a lead 32 connected to the outermost grounded foil layer 15 of the condenser body 10. Also, it will be noted that the lower end of the soldered ring 29 is soldered into a recess 33 provided in a flexible ring-shaped diaphragm member 34, which, in turn, is soldered, as at 35 to the upper extremity of the flange tube 7.

A cup-shaped flexible diaphragm member 28 of copper, for example, is solder-sealed to the upper end of the porcelain casing 3 with a ring shaped gasket 36 disposed therebetween, and a self-tapping screw 37 is provided for filling the interior with oil 17, and bleeding the air therefrom. Subsequently, the self-tapping screw 37 is soldered over for a hermetically-sealed construction.

The upper open end 39 of the copper flexible diaphragm 28 is brazed to the outer surface of a thimble 40, which is screwed to the upper threaded end 8a of the tubular terminal stud 8 extending axilly through the bushing 1. It will be noted that with the aforeaid construction, a lead (not shown), as in a transformer application, may be fished upwardly through the tubular lead 8, and secured to an upper terminal 42 having a threaded cavity 43, a nut 45 locking the lead in place. The top terminal cap 46 may, in turn, be fixedly secured to the upper flange portion of the thimble 40 by bolts 48, a flange gasket 49 being inserted therebetween.

To avoid heating affects, the mounting flange plate 23 is preferably made from a non-magnetic material, such as aluminum, and the flange tube 7 itself is also preferably of a non-magnetic material, such as copper or brass.

Figure 7:
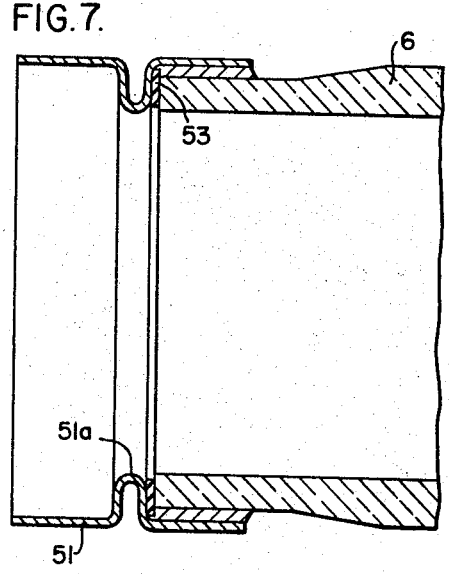
FIGS. 7–10 illustrate, to an enlarged scale, the seals employed in the securement of the ends of the casing structures of the terminal bushing of FIG. 1; and, FIG. 11 is a fragmentary view of a modified-type of terminal bushing incorporating the principles of the present invention, and utilizing a gaseous insulating medium together with a condenser body of a suitable thermosetting material.
Figure 8:
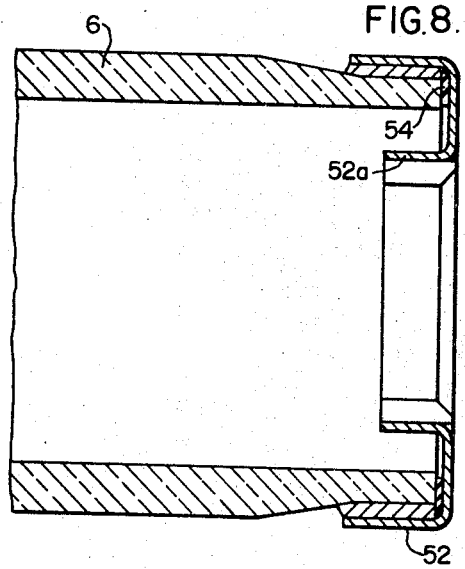
Figure 9:
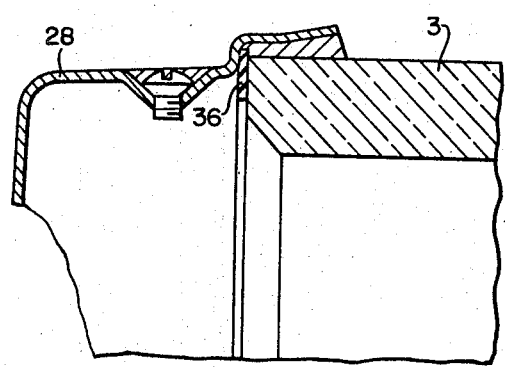
Figure 10:
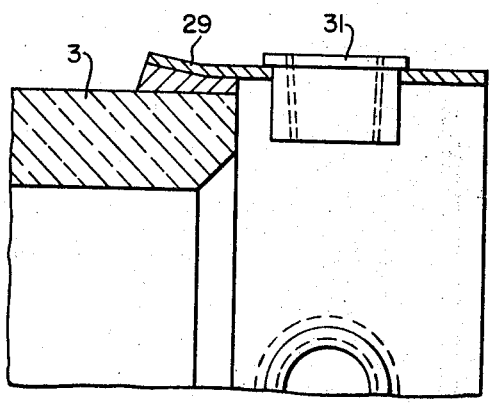

With reference to FIG. 2B and FIGS. 7 and 8, it will be noted that again flexible spun copper rings 51, 52 are solder-sealed to the upper and lower ends of the lower porcelain casing 6, preferably ring-shaped gaskets 53, 54 being interposed therebetween. The inturned end 52a of the lower closure ring 52 is secured, as by soldering 55, to the lower end 8a of the tubular conductor stud 8, as shown more clearly in FIG. 2B of the drawings.

It will be observd that the upper ring-shaped flexible copper diaphragm 51 has an interned loop portion 51a, which provides flexibility between the upper end 6b of the lower porcelain casing 6 and the lower end of the flange tube 7.

It will be observed that the lower end of the tubular conductor lead 8 is threaded, so as to be used in circuit-breaker applications for threading a contact foot (not shown), which in turn supports the arc-extinguishing unit structure of a circuit breaker.

Figure 11:
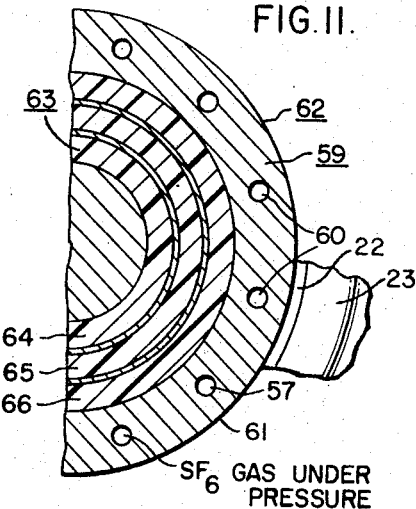

The present invention contemplate the use of a dielectric medium 17 within the upper and lower chambers, or cavities 20, 21 other than oil. For example, a pressurized high-dielectric-strength gas, such as sulfur-hexafluoride ($SF_6$) gas 57 (FIG. 11), may be used under a pressure, for example, of 45 p.s.i. Additionally, other means than the grooves 18 may be provided for the communication between the upper and lower chambers 20, 21. For example, FIG. 11 shows an alternate mounting flange-plate construction 59 in which ducts, or bores 60 are provided within the metallic body portion of the flange tube 61. This is particularly desirable where the pressing of the condenser body 10 longitudinally within the flange tube 61 might result in a somewhat shredding operation of forcing loose material within the grooves 18, and thereby blocking their communicating function. The bores 60, as shown in FIG. 11, would obviously obviate such a difficulty.

In addition, the present invention contemplates the use of other materials for the upper and lower casing structures 3, 6 than porcelain. For example, a suitable thermosetting material, such as epoxy resin or polyester resin, may be utilized. In addition, a suitable butyl rubber or elastomeric material may be used. Reference may be made to United States Kessel Pats. 2,997,526; 2,997,527; 2,997,528 for a description of suitable materials of a non-tracking nature, which may be utilized for the insulating casing structures 3, 6 in place of the porcelain, as shown in FIGS. 2A and 2B.

Moreover, the condenser body 10 may be formed of a suitable thermosetting material, such as set forth in U.S. Pat 3,001,004 issued Sept. 19, 1961 to Richard G. Black, U.S. Pat. 3,001,005 issued Sept. 19, 1961 to Charles F. Sonnenberg, and U.S. Pat. 3,018,318, issued Jan. 23, 1962 to Le Roy H. Franklin, and U.S. Conangla Pat. 2,945,913 issued July 19, 1960, for suitable cast or molded resinous materials, which may be used for the condenser-body portion 10 of the terminal bushing. In fact, the mounting flange 23 itself may be of a plastic material, such as exemplified in FIG. 5 of U.S. Pat. 3,001,-005, and come within the contemplation of the present invention.

Finally, reference may be made to L. E. Sauer, U.S. Pat. 3,257,501 issued June 21, 1966 for a thermosetting resin, which is injected between concentrically-arranged condenser tube bodies, for the fabrication of the condenser section. In other words, various structures may be used for the condenser body 10 other than the paper winding, as described heretofore.

In more detail, FIG. 11 shows an alternate type of terminal-bushing structure 62 in which the communicating bores 60 are provided within the flange tube 61, and a cast resinous body 63 is used in place of the paper windings. A polyester resin or an epoxy resin may be used as the solid dielectric mtaerial 63 disposed between the intervening condenser sections 64–66. As mentioned, these may be self-supporting tubes, such as aluminum tubes, between which the resin 63 may be injected and subsequently cured.

From the foregoing description, it will be apparent that we have provided an improved high-mechanical-strength terminal bushing 1 in which the condenser body 10 is rigidly secured to the flange tube 7, and in which no axial or cantilever forces are imposed upon the upper and lower insulating casing sections 3, 6. In addition, a fluid medium, such as oil 17 or a gas 57, preferably under pressure, may be employed in the upper and lower chambers or cavities 20, 21, communication being afforded either by a grooved constructon 18 on the inner wall of the flange tube 7, or the bores 60 within the body portion of the flange tube 61, as illustrated in FIG. 11.

The aforesaid construction results in a minimum of radial dimensions, inasmuch as the flange tube 7 closely surrounds the intermediate portion of the condenser body 10, and thereby reduces the radial dimensions. This is a requirement for meeting certain ASA specifications.

For providing a hermetically-sealed construction, it is desirable to utilize the aforesaid solder-sealed constructions, such as set forth in the aforesaid two Pats. 1,852,043 and 1,872,557. However, it is to be clearly understood that where adhesive materials, or suitable cements are available, which will provide a long-lasting seal to prevent the entrance of moisture and air into the cavities 20, 21, such alternate seals may be employed in place of the solder-sealing constructions as described heretofore. Since, however, solder-sealing constructions have been utilized for such a long time in the art, it is obvious that they may be relied upon with certainty. However, it is to be clearly understood that the invention contemplates the use of other seals, either in use currently and reliable, or such as may be available in the future to provide, in essence, a hermetically-sealed high-strength-mechanical bushing.

We claim as our invention:

1. A high-mechanical-strength terminal bushing comprising, in combination:
   (a) a terminal lead;
   (b) an elongated insulating body surrounding said terminal lead at least along the mid-portion thereof;
   (c) a grounded mounting flange assembly including a grounded flange tube firmly supporting the outer mid-portion of said elongated insulating body to rigidly support the same;
   (d) an upper insulating outer casing flexibly supported to the upper end of said terminal lead and also to the upper portion of the grounded mounting flange assembly and defining an upper dielectric chamber;
   (e) a lower insulating outer casing flexibly supported to the lower end of said terminal lead and also to the lower portion of the grounded mounting flange assembly and defining a lower dielectric chamber;
   (f) a fluid dielectric medium disposed in said two dielectric chambers; and,
   (g) fluid-communicating means extending axially along said flange tube and interconnecting said two dielectric chambers.

2. The high-mechanical-strength terminal bushing of claim 1, wherein the flexible connections constitute hermetic seals.

3. The high-mechanical-strength terminal bushing of claim 1, wherein the dielectric medium is oil and the elongated insulating body is an oil-impregnated paper wrapping the paper layers being bonded together by an adhesive.

4. The combination of claim 3, wherein at least one of the casings is of porcelain composition.

5. The combination of claim 3, wherein both of the casings are of porcelain composition.

6. The high-mechanical-strength terminal bushing of claim 1, wherein the elongated insulating body is formed of a thermosetting resin.

7. The high-mechanical-strength terminal bushing of claim 1, wherein the dielectric medium is a high-dielectric-strength gas.

8. The combination of claim 7, wherein the gas is sulfur-hexafluoride ($SF_6$) gas.

9. The high-mechanical-strength terminal bushing of claim 1, wherein the flexible connection comprise flexible metallic diaphragm members.

10. The combination of claim 9, wherein solder-seals secure the flexible metallic diaphragm members to porcelain casings.

References Cited

UNITED STATES PATENTS

| | | | |
|---|---|---|---|
| 2,086,078 | 7/1937 | Haefely | 174—31 X |
| 2,125,089 | 7/1938 | Skvortzoff | 174—31 X |
| 2,308,022 | 1/1943 | Peterson et al. | 174—31 X |
| 2,322,214 | 6/1943 | Kirkwood et al. | 174—31 X |
| 2,524,539 | 10/1950 | Perolini | 174—31 |
| 3,059,044 | 10/1962 | Friedrich et al. | 174—18 |
| 3,257,501 | 6/1966 | Sauer | 174—143 |

FOREIGN PATENTS 589,161  2/1925  France.

LARAMIE E. ASKIN, Primary Examiner

U.S. Cl. X.R.

174—143